US011111012B2

(12) United States Patent
Foskey et al.

(10) Patent No.: US 11,111,012 B2
(45) Date of Patent: Sep. 7, 2021

(54) HUB WITH INTEGRAL ELASTOMERIC BEARING

(71) Applicant: Bell Textron Inc., Fort Worth, TX (US)

(72) Inventors: Whitney Renee Foskey, Keller, TX (US); Gary Miller, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 16/589,205

(22) Filed: Oct. 1, 2019

(65) Prior Publication Data
US 2021/0094680 A1  Apr. 1, 2021

(51) Int. Cl.
*F16C 11/08* (2006.01)
*B64C 27/35* (2006.01)

(52) U.S. Cl.
CPC .............. *B64C 27/35* (2013.01); *F16C 11/08* (2013.01)

(58) Field of Classification Search
CPC ...... F16C 11/08; F16C 11/083; F16C 27/063; F16C 1/403; F16C 1/41; F16F 1/40; F16F 1/393; B64C 27/35
See application file for complete search history.

(56) References Cited

U.S. PATENT DOCUMENTS

| 3,942,910 | A | * | 3/1976 | Snyder | B64C 27/32 416/141 |
| 4,264,277 | A | * | 4/1981 | McCafferty | B64C 27/35 403/348 |
| 4,729,753 | A | * | 3/1988 | Neathery et al. | B64C 27/35 464/71 |
| 5,110,260 | A | * | 5/1992 | Byrnes et al. | B64C 11/12 416/134 |
| 5,482,406 | A | * | 1/1996 | Arlt, III | E21B 19/006 405/195.1 |
| 9,334,048 | B2 | * | 5/2016 | Burnett | B64C 27/35 |
| 2010/0009764 | A1 | * | 1/2010 | Stamps | B64C 27/32 464/109 |
| 2014/0270610 | A1 | * | 9/2014 | Schofield et al. | F16C 27/063 384/220 |
| 2015/0125300 | A1 | * | 5/2015 | Stamps et al. | B64C 27/37 |
| 2015/0240868 | A1 | * | 8/2015 | Buesing | F16C 29/02 416/134 A |
| 2018/0037318 | A1 | * | 2/2018 | Day | B64D 45/00 |
| 2018/0162519 | A1 | * | 6/2018 | Parham, Jr. | B64C 27/54 |

* cited by examiner

*Primary Examiner* — Phillip A Johnson
(74) *Attorney, Agent, or Firm* — Lightfoot & Alford PLLC (57) ABSTRACT

A rotor hub assembly includes a yoke and a high capacity laminated (HCL) bearing, comprising layers of elastomeric material and layers of metal. The HCL bearing is affixed to the yoke to prevent separation of the HCL bearing from the yoke.

18 Claims, 8 Drawing Sheets

HUB WITH INTEGRAL ELASTOMERIC BEARING

BACKGROUND

Elastomeric bearings are used to allow limited relative motion of mechanical components, such as those in aircraft rotor hubs. One type of elastomeric bearing is a high capacity laminated (HCL) bearing, comprising bonded alternating layers of elastomeric material and a stiff material, such as a metal. These HCL bearings can withstand high axial loads and oscillation, and they offer long life, no lubrication requirement, and failsafe operation. In conventional rotor hubs, HCL bearings are mounted relative to yokes in a manner that can allow movement of the HCL bearings relative to the yokes, which can damage the HCL bearings, the yokes, and/or other components.

BRIEF DESCRIPTION OF THE DRAWINGS

Prior Art

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Mechanical components used in aircraft, road vehicles, and other applications may require bearings for allowing relative motion of the components. For example, spherical laminated elastomeric bearings are often used for rotor hubs in rotary-wing aircraft, such as for allowing the yoke to gimbal relative to the mast.

Figure 1:
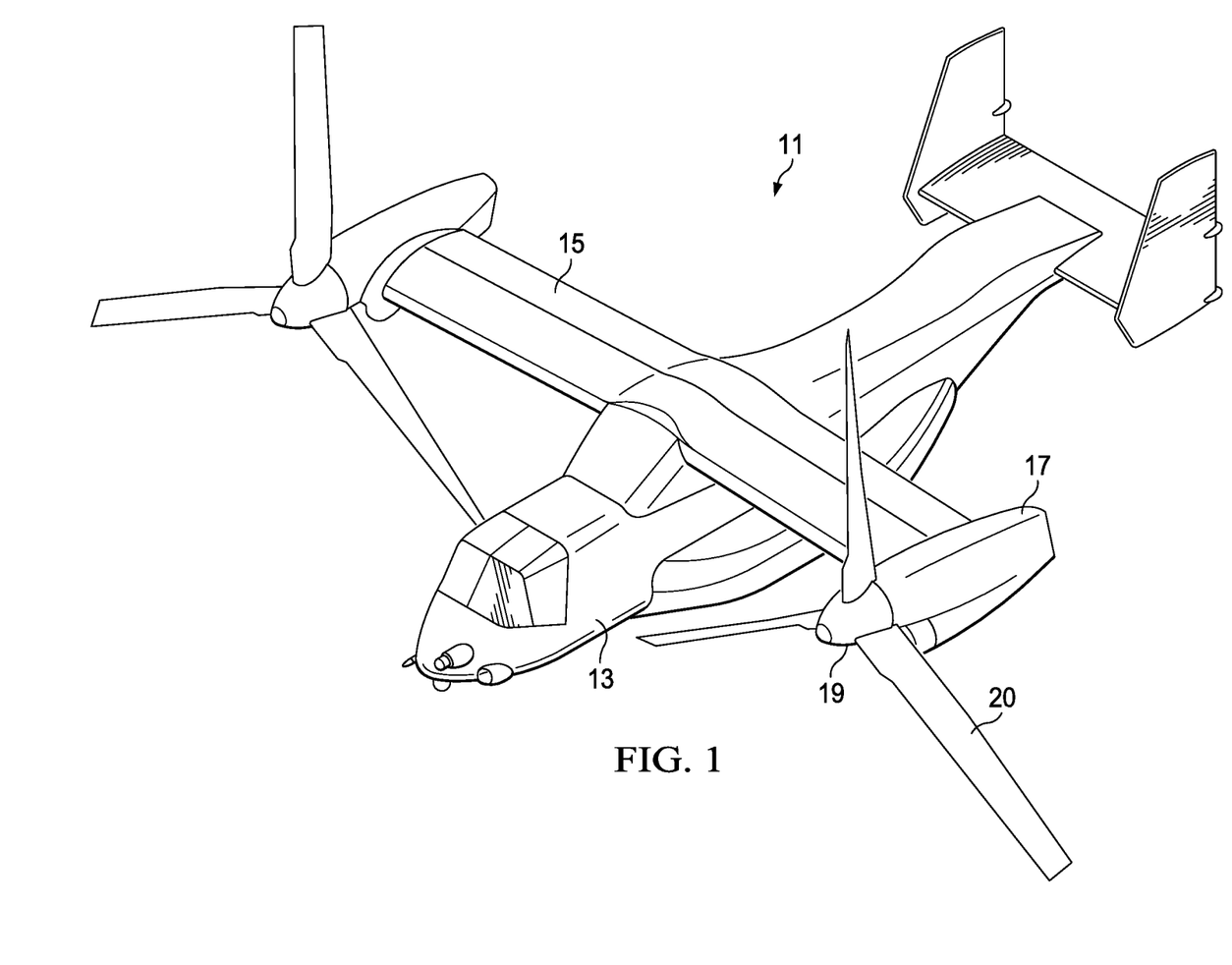
FIG. 1 is an oblique view of an aircraft comprising a hub according to this disclosure.

FIG. 1 illustrates an aircraft 11 comprising elastomeric bearings according to this disclosure. Aircraft 11 comprises a fuselage 13, transverse wing 15, and rotatable nacelles 17 at opposing ends of wing 15. Each nacelle 17 houses an engine (not shown) for causing rotation of an associated rotor hub assembly 19. In the embodiment shown, each rotor hub assembly 19 is configured for supporting three blades 20.

Figure 2:
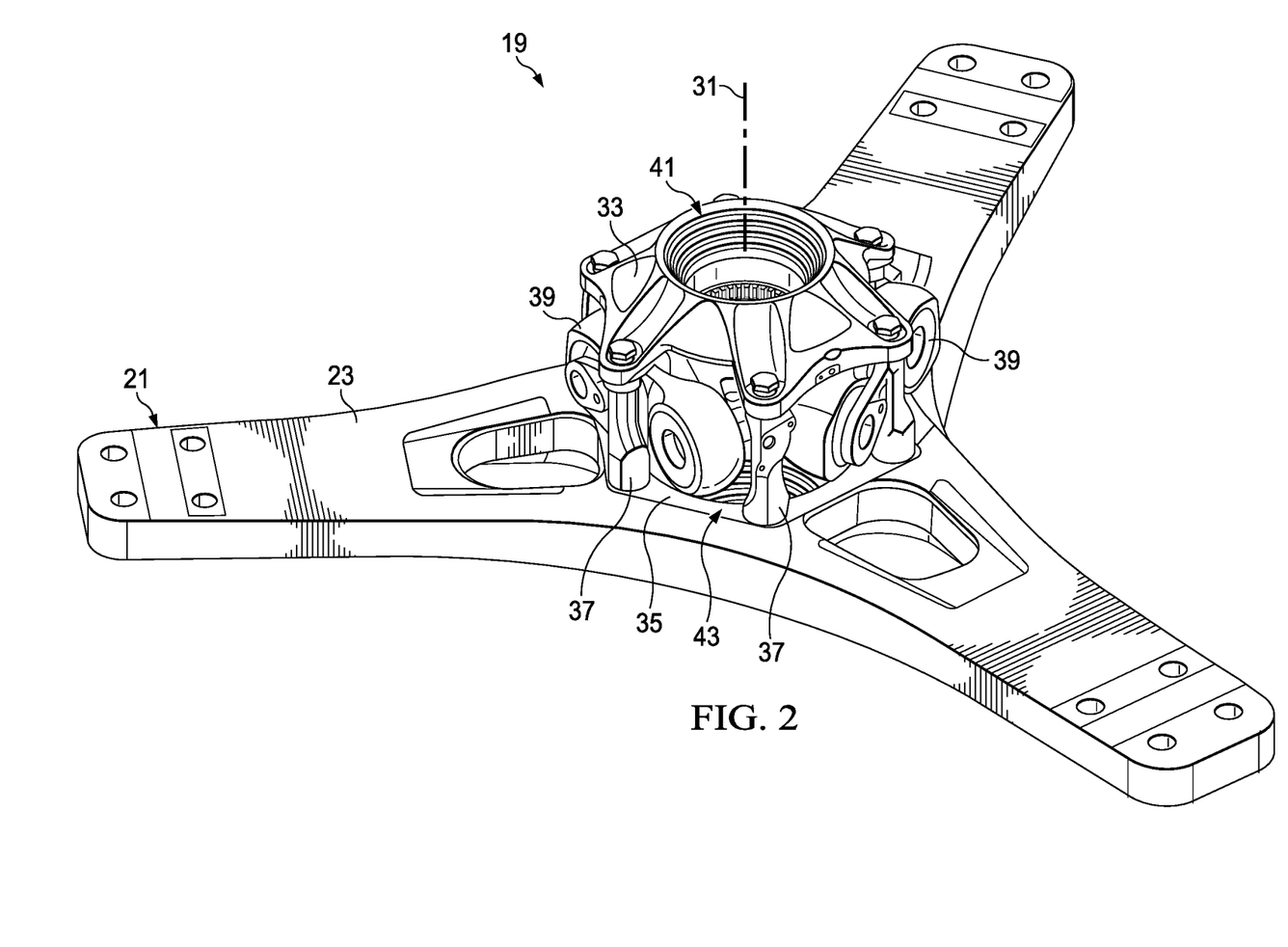
FIG. 2 is an oblique view of components of a rotor hub of the aircraft of FIG. 1 incorporating a hub having integral HCL bearings according to this disclosure.
Figure 3:
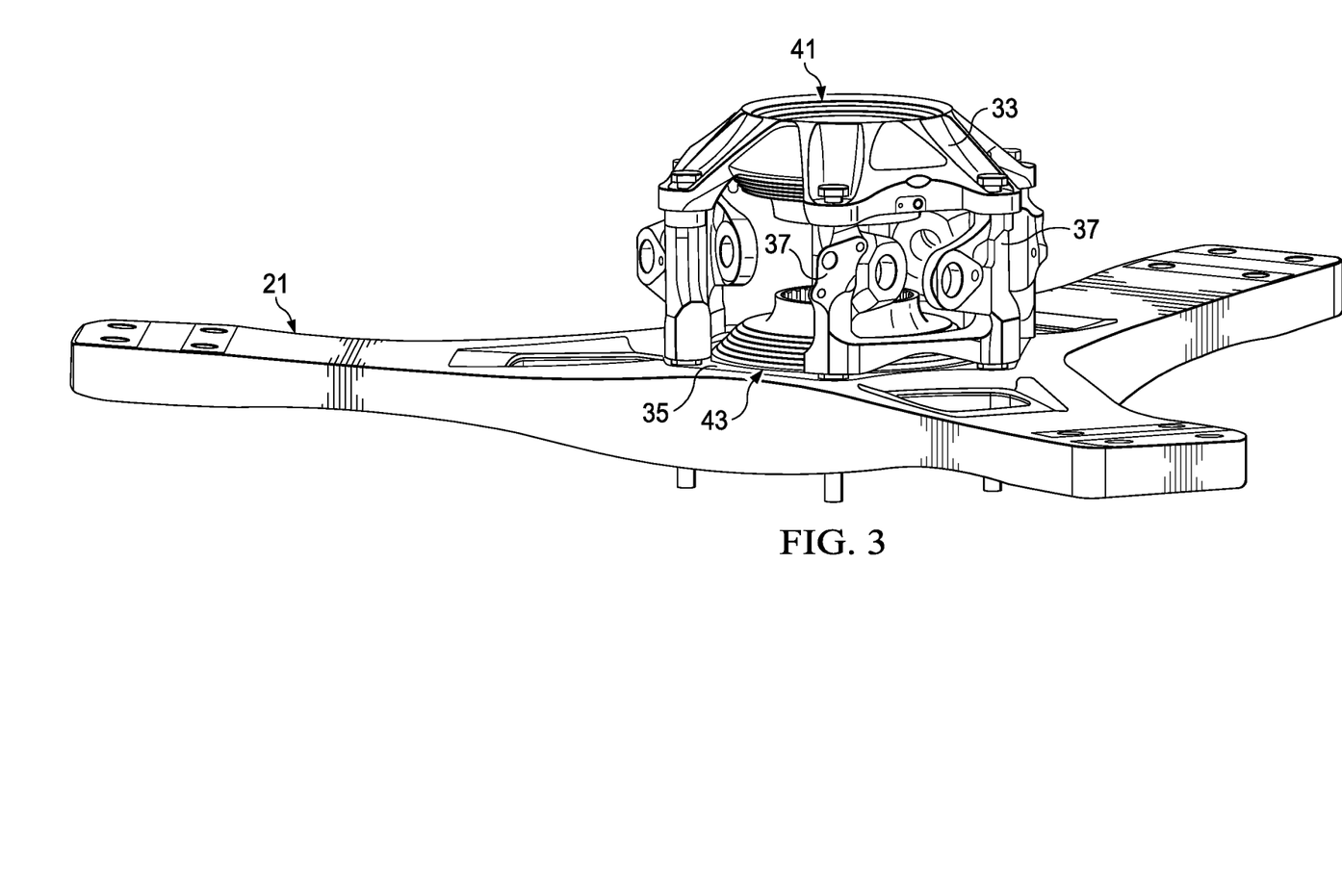
FIG. 3 is an oblique view of the rotor hub of FIG. 2 with components removed for ease of viewing.
Figure 4:
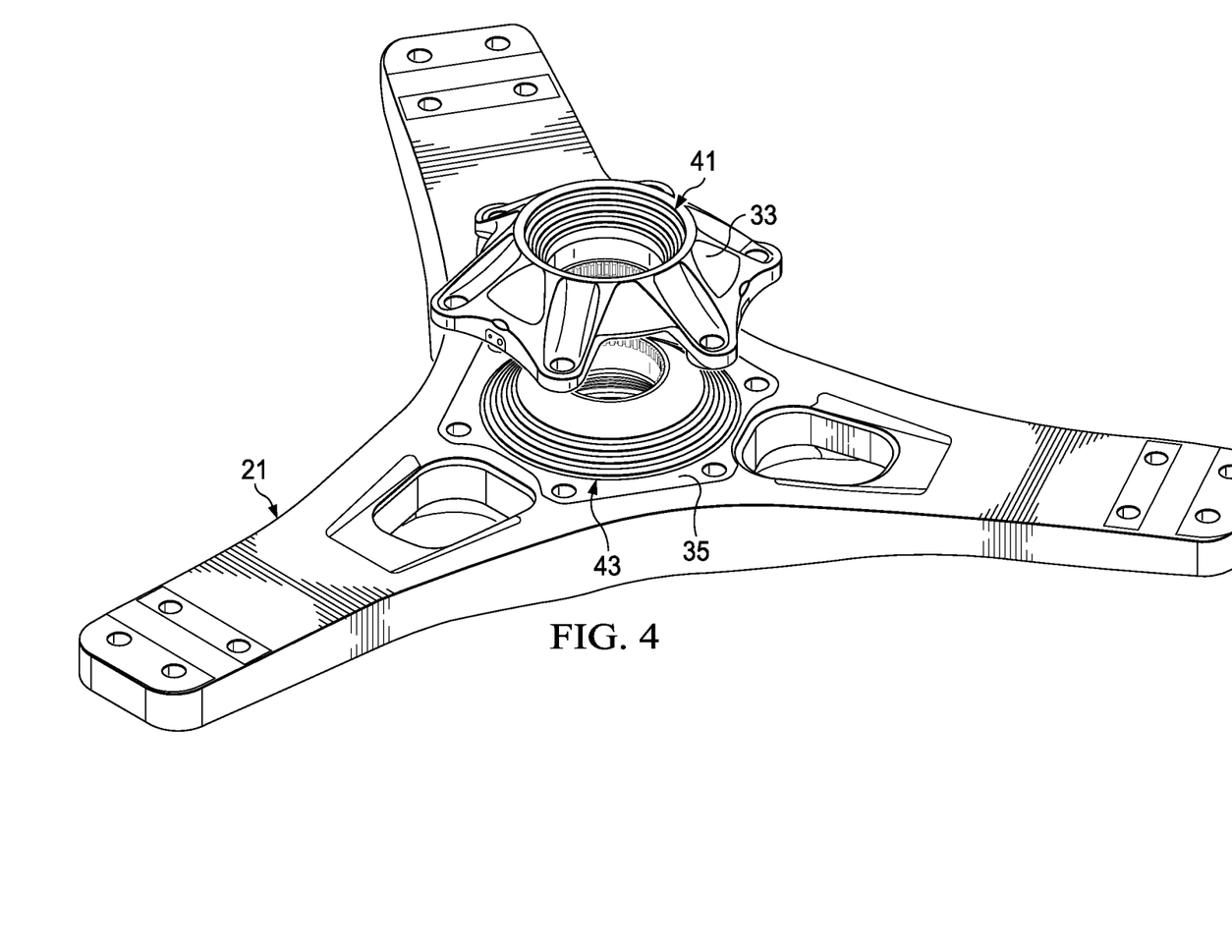
FIG. 4 is an oblique view of the rotor hub of FIG. 2 with additional components removed for ease of viewing.

FIGS. 2 through 4 are oblique views of components of rotor hub assembly 19, which incorporates elastomeric bearings according to this disclosure. Rotor hub assembly 19 comprises a yoke 21 having three arms 23 extending radially outward from a central portion of yoke 21. Yoke 21 is driven in rotation about axis 31 by a driveshaft (not shown) that engages a central splined drive hub (not visible). The drive hub is connected to an upper bearing plate 33 and a lower bearing plate 35 through three pairs of clevis members 37, each pair forming a clevis. The leading end of each of three drive links 39 is connected to the drive hub, and the trailing end of each link 39 is connected to the clevis formed by an associated pair of clevis members 37.

Rotor hub assembly 19 allows for gimballing, or pivoting, of yoke 21 relative to mast axis 31, and an upper hub spring bearing 41 and a lower hub spring bearing 43 provide a centering force and react loads from yoke 21. Bearings 41, 43 are laminated elastomeric bearings, as described above, comprising alternating bonded layers of elastomer and metal. Upper hub spring bearing 41 is fixedly mounted in upper bearing plate 33, and lower hub spring bearing 43 is fixedly mounted in lower bearing plate 35.

Figure 5:
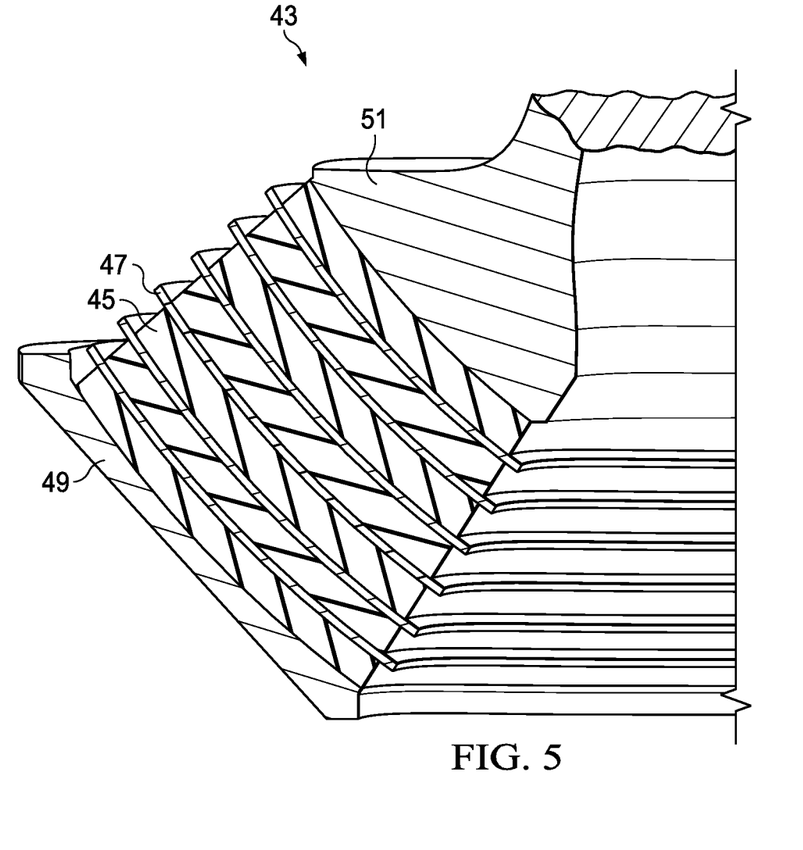
FIG. 5 is a side cross-sectional view of a portion of an HCL bearing of the rotor hub of FIG. 2.

FIG. 5 is a side cross-section view of a portion of lower hub spring bearing 43, which is constructed similarly to upper hub spring bearing 41. Bearings 41, 43 comprise alternating elastomeric layers 45 and metal layers 47, each layer 45, 47 being bonded to the adjacent layers 45, 47. An outer member 49 is bonded to the associated bearing plate 33, 35, whereas an inner member 51 engages the mast. In this manner, bearings 41, 43 act as spherical gimbal bearings, with elastic deformation occurring in the elastomeric layers 45 relative to each other and to metal layers 47.

Figure 6:
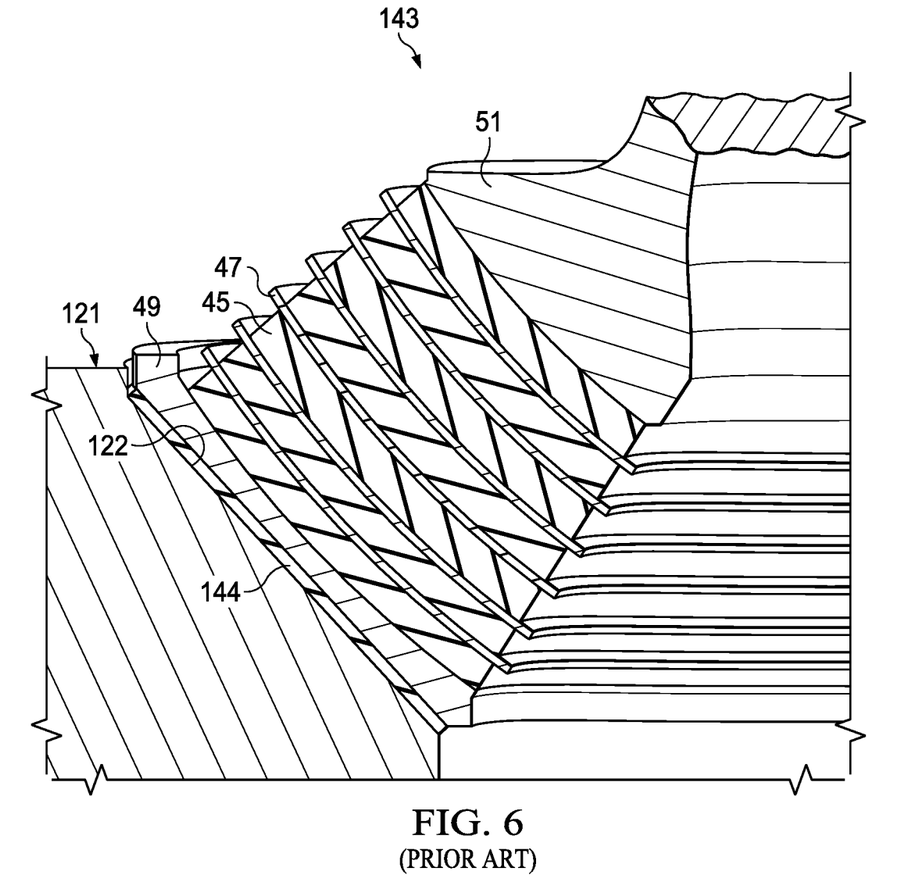
FIG. 6 is a side cross-section view of a portion of a conventional HCL bearing adjacent a conventional yoke in a conventional manner.

Referring now to Prior Art FIG. 6, a side cross-section view of a portion of a conventional lower hub spring bearing 143 that is substantially the same as lower hub spring bearing 43 is shown. Lower hub spring bearing 143 is shown mounted adjacent a conventional yoke 121 that is substantially the same as yoke 21. Yoke 121 comprises a central cone interface 122 configured to nearly abut the outer member 49 of conventional bearing 143. However, the outer member 49 of the conventional bearing 143 is not installed to directly contact the conventional yoke 121. Instead, the conventional lower hub spring bearing 143 is mounted adjacent to and slightly offset from yoke 121 in a conventional manner, namely, with a buffer material 144 disposed therebetween. The buffer material 144 typically comprises a non-metallic material. Although the conventional lower hub spring bearing 143 can be pressed hard against the buffer material 144 disposed between the outer member 49 and the central cone interface 122 of the yoke 123, under some extreme operating conditions, the conventional lower hub spring bearing 143 may nonetheless move relative to the central cone interface 122. In some cases, the movement is referred to as jumping or fretting, and the undesirable results can include impact and wear damage to the yoke 121 and surrounding components. In some cases, drive links have needed modification to allow the undesirable movement to occur without contacting the drive links.

Figure 7:
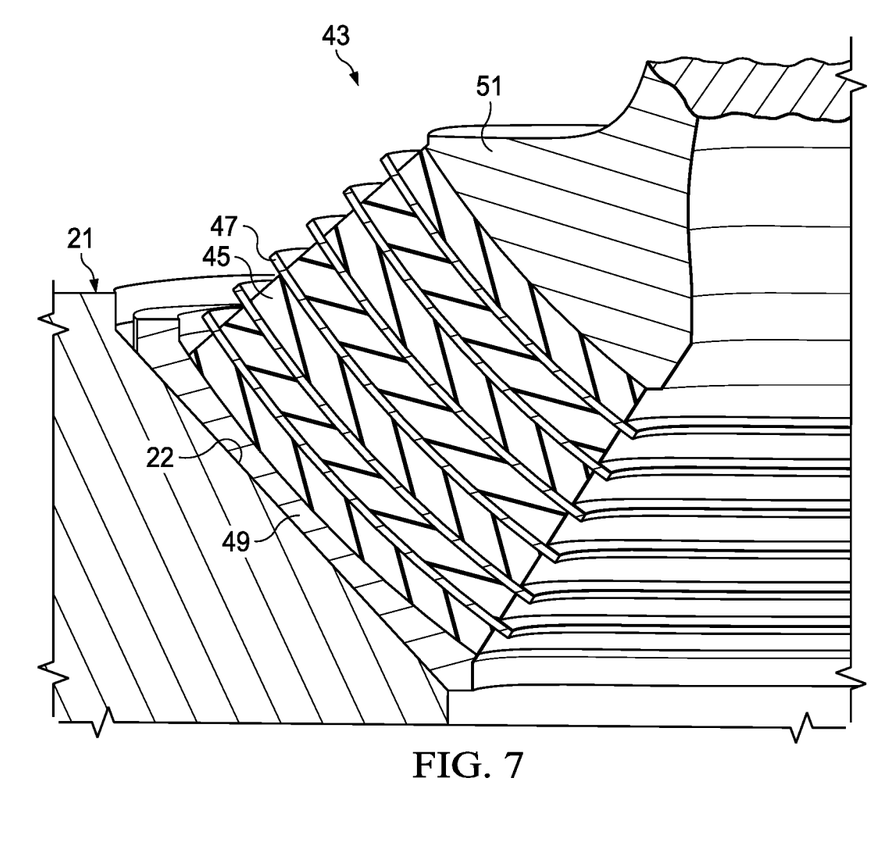
FIG. 7 is a side cross-section view of a portion of the HCL bearing of FIG. 5 connected to a yoke according to an embodiment of this disclosure.
Figure 8:
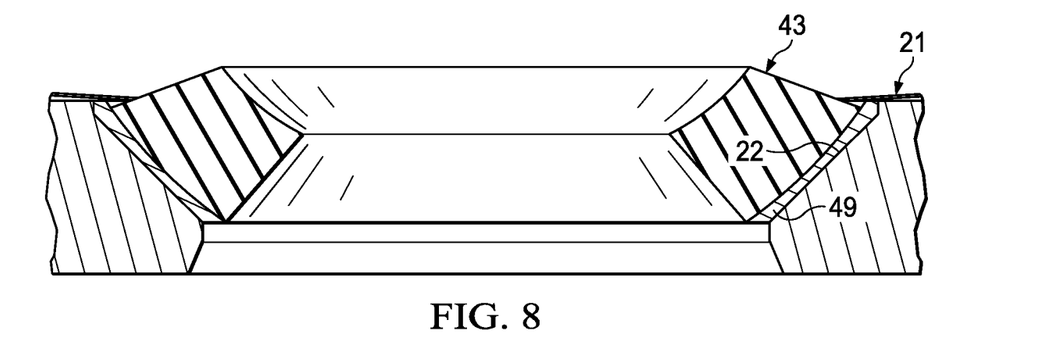
FIG. 8 is a side cutaway view of the HCL bearing of FIG. 5 connected to a yoke according to an embodiment of this disclosure.

Referring now to FIG. 7, a side cross-section view of a portion of lower hub spring bearing 43 mounted adjacent to yoke 21 is shown. Yoke 21 comprises a central cone interface 22 that is substantially similar to central cone interface 122, however, central cone interface 22 and outer member 49 are sized and shaped to substantially directly interface each other and to maintain a fixed position relative to each other by bonding the outer member 49 directly to the central cone interface 22. In this embodiment, the entire yoke 21 is constructed as a singular composite component. Referring now to FIG. 8, a cutaway view of the lower hub spring bearing 43 is shown bonded to the yoke 21. In this embodiment, the outer member 49 is bonded to the central cone interface 22. In an alternative embodiment, a bearing substantially similar to lower hub spring bearing 43 can be provided without the outer member 49, and an outermost elastomeric portion of the bearing can be bonded directly to the central cone interface 22.

Figure 9:
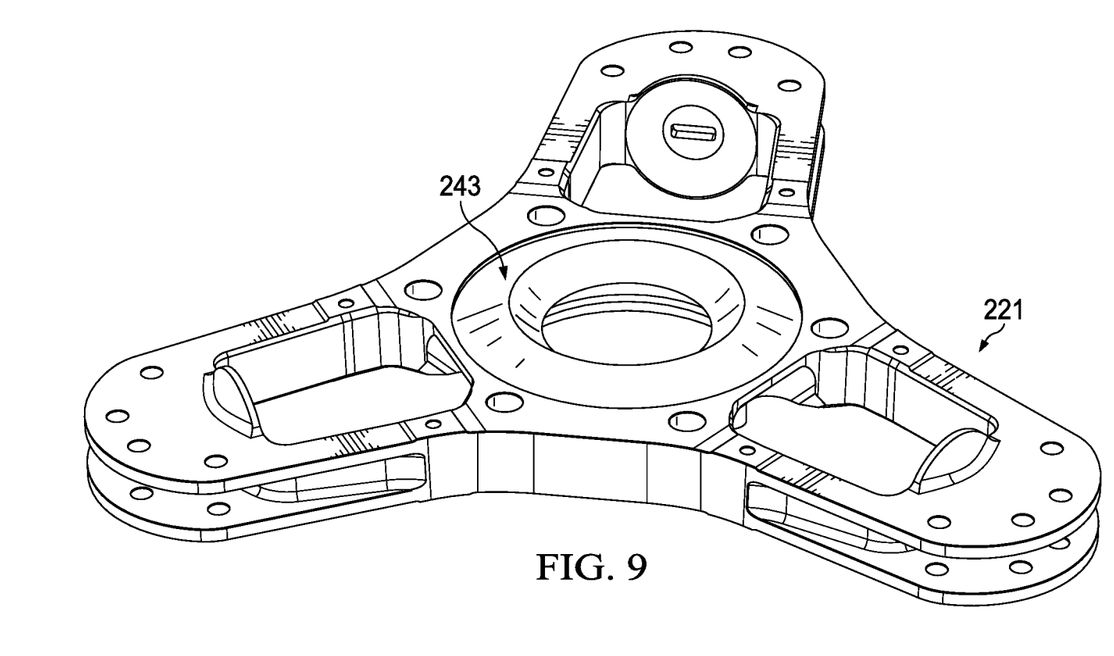
FIG. 9 is an oblique view of an HCL bearing connected to a metal yoke according to an embodiment of this disclosure.
Figure 10:
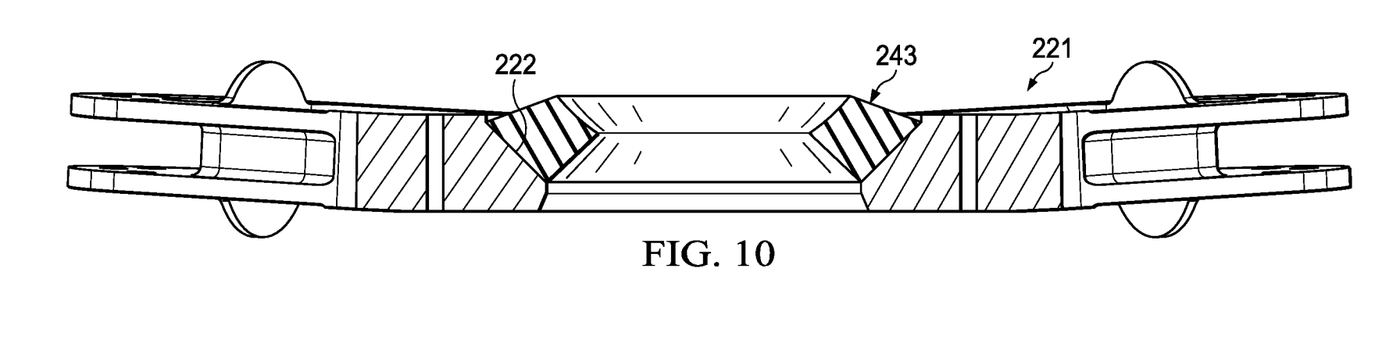
FIG. 10 is a side cutaway view of the HCL bearing and yoke of FIG. 9.

Referring now to FIG. 9, an oblique view of metal yoke 221 is shown. In this embodiment, the metal yoke 221 is constructed entirely of metal. Yoke 221 comprises a central cone interface 222. Because yoke 221 comprises metal rather than fiberglass or other composite materials, yoke 221 can withstand greater temperature and pressure. Accordingly, in this embodiment, an HCL bearing 243 comprising no outer member can be permanently affixed to the yoke 221 by vulcanizing the outermost located elastomeric material while the material is in contact with the central cone interface 222.

Each of the embodiments of FIG. 7-10 show a bearing fixed directly to a yoke without a buffer material that allows relative movement between the bearing and the yoke. In other words, the embodiments disclosed herein prevent the bearings from jumping out of the central cone interfaces by affixing them relative to the central cone interfaces. Such affixation prevents not only the above-described longitudinal separation (jumping), but also prevents rotation of the bearing relative to the central cone interface. In further embodiments, the portion of the bearings intended to be affixed to the yoke may comprise shape profiles that require a specific orientation of the bearing relative to the yoke. For example, the bearing and yoke can comprise complementary angular features selected to require a predetermined angular orientation of the bearing relative to the yoke for the bearing to fully interface with the central cone interface.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A rotor hub assembly, comprising:
   a yoke; and
   a high capacity laminated (HCL) bearing, comprising layers of elastomeric material and layers of metal, the HCL bearing being affixed to the yoke to prevent separation of the HCL bearing from the yoke;
   wherein the HCL bearing is not captured by a shape profile of the yoke to which the HCL bearing is affixed;
   wherein the HCL bearing comprises a closed-loop shape disposed about a mast axis of the rotor hub assembly; and
   wherein the HCL bearing is affixed to the yoke using a frustoconical shaped profile of the yoke.

2. The rotor hub assembly of claim 1, wherein the HCL bearing is affixed to a central cone interface of the yoke.

3. The rotor hub assembly of claim 2, wherein the elastomeric material of the HCL bearing is bonded to the central cone interface.

4. The rotor hub assembly of claim 3, wherein the yoke is a composite yoke.

5. The rotor hub assembly of claim 3, wherein the yoke is a metal yoke.

6. The rotor hub assembly of claim 1, wherein the yoke comprises metal and the elastomeric material of the HCL bearing is vulcanized to the yoke.

7. The rotor hub assembly of claim 6, wherein the elastomeric material of the HCL bearing is vulcanized to a central cone interface of the yoke.

8. The rotor hub assembly of claim 1, wherein the HCL bearing comprises an outer member affixed to the yoke.

9. The rotor hub assembly of claim 8, wherein the outer member comprises metal.

10. The rotor hub assembly of claim 9, wherein the outer member is bonded to a central cone interface of the yoke.

11. The rotor hub assembly of claim 1, wherein a portion of the HCL bearing closest to the yoke is prevented from rotating relative to the yoke.

12. A method of constructing a rotor hub assembly, comprising:
    providing a yoke and a mast; and
    affixing a high capacity laminated (HCL) bearing to the yoke to prevent separation of the HCL bearing from the yoke without using the yoke to capture the HCL bearing;
    wherein the HCL bearing comprises a closed-loop shape disposed about a mast axis of the rotor hub assembly; and
    wherein the HCL bearing is affixed to the yoke using a frustoconical shaped profile of the yoke.

13. The method of claim 12, wherein the yoke is a composite yoke.

14. The method of claim 13, wherein an elastomeric portion of the HCL bearing is bonded to the yoke.

15. The method of claim 13, wherein a metal portion of the HCL bearing is bonded to the yoke.

16. The method of claim 15, wherein the metal portion comprises an outer member.

17. The method of claim 12, wherein the yoke is a metal yoke.

18. The method of claim 17, wherein the HCL bearing is affixed to the yoke using a vulcanization process.

\* \* \* \* \*